United States Patent
Benedetti et al.

(10) Patent No.: US 11,163,556 B2
(45) Date of Patent: *Nov. 2, 2021

(54) SOFTWARE CHANGE TRACKING AND MANAGEMENT

(71) Applicant: INTERNATIONAL BUSINESS MACHINES CORPORATION, Armonk, NY (US)

(72) Inventors: Fabio Benedetti, Rome (IT); Fabio Cerri, Rome (IT); Arcangelo Di Balsamo, Rome (IT)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/562,658

(22) Filed: Sep. 6, 2019

(65) Prior Publication Data
US 2019/0391805 A1 Dec. 26, 2019

Related U.S. Application Data

(63) Continuation of application No. 15/835,928, filed on Dec. 8, 2017, now Pat. No. 10,606,583.

(51) Int. Cl.
*G06F 9/44* (2018.01)
*G06F 8/71* (2018.01)
*G06F 9/445* (2018.01)
*G06F 8/65* (2018.01)

(52) U.S. Cl.
CPC .................. *G06F 8/71* (2013.01); *G06F 8/65* (2013.01); *G06F 9/44505* (2013.01)

(58) Field of Classification Search
CPC .......... G06F 8/71; G06F 8/65; G06F 9/44505
See application file for complete search history.

(56) References Cited

U.S. PATENT DOCUMENTS

| 7,614,046 B2 | 11/2009 | Daniels et al. |
| 8,677,315 B1* | 3/2014 | Anderson ............. G06F 9/4411 717/110 |
| 8,683,430 B2 | 3/2014 | Gonzales et al. |

(Continued)

OTHER PUBLICATIONS

Notice of Allowance dated Nov. 27, 2019 in U.S. Appl. No. 15/835,928, 10 pages.

(Continued)

*Primary Examiner* — Hang Pan
(74) *Attorney, Agent, or Firm* — Aaron Pontikos; Andrew D. Wright; Roberts Calderon Safran & Cole, P.C.

(57) ABSTRACT

Systems and methods for software tracking and management are disclosed. In embodiments, a computer-implemented method comprises: receiving, by a computing device, build output code from one or more user computer devices via a network, wherein the build output code is generated in response to a software build; automatically identifying, by the computing device, differences between the build output code and associated in-production software code; automatically mapping, by the computing device, the differences to microservices of the in-production software code; and generating, by the computing device, a list of microservices of the in-production software code affected by the differences in a rollout of the build output code based on the mapping.

18 Claims, 4 Drawing Sheets

(56) References Cited

U.S. PATENT DOCUMENTS

| | | | |
|---|---|---|---|
| 8,954,311 B2 | 2/2015 | Gupta et al. | |
| 2010/0095273 A1 | 4/2010 | Matthiesen | |
| 2010/0153908 A1 | 6/2010 | Sarkar et al. | |
| 2010/0162225 A1* | 6/2010 | Huang | G06F 8/72 717/171 |
| 2011/0209140 A1* | 8/2011 | Scheidel | G06F 8/60 717/172 |
| 2012/0180024 A1 | 7/2012 | Gonzalez et al. | |
| 2014/0013304 A1 | 1/2014 | Vangala et al. | |
| 2015/0089488 A1* | 3/2015 | Anderson | G06F 8/65 717/172 |
| 2015/0089494 A1* | 3/2015 | Beak | G06F 9/45558 718/1 |
| 2016/0124742 A1* | 5/2016 | Rangasamy | G06F 9/5072 717/103 |
| 2016/0210215 A1 | 7/2016 | Shani et al. | |
| 2018/0349257 A1* | 12/2018 | Bhattacharjee | G06F 8/71 |
| 2019/0179631 A1 | 6/2019 | Benedetti et al. | |

OTHER PUBLICATIONS

Kerzazi et al. "Botched Releases: Do we Need to Roll Back? Empirical study on a Commercial Web App", https://www.researchgate.net/profile/Noureddine_Kerzazipublication/292143494_Botched_Releases_Do_We_Need_to_Roll_Back_Empirical_Study_on_a_Commercial_Web_App . . . , 23rd IEEE International Conference on Software Analysis, Evolution, and Reengineering, Mar. 2016, 10 pages.

Anonymous, "Continuous Delivery and ITIL: Change Management", https://continuousdelivery.com/2010/11/continuous-delivery-and-itil-change-management/. Continuous Delivery, Nov. 29, 2010, 10 pages.

Nadi et al., "Does the past say it all? Using history to predict change sets in a CMDB", https://www.researchgate.net/profile/Serge_Mankovskii/publication/224219318_Does_the_Past_Say_It_All_Using_History_to_Predict_Change_Sets_in_a_CMDB . . . Proceedings of the Euromicro Conference on Software Maintenance and Reengineering, CSMR, Apr. 2010, 10 pages.

Anonymous, Microservices, https://en.wikipedia.org/wiki/Microservices, accessed Nov. 27, 2017, 7 pages.

Fowler et al., "Microservices: a definition of this new architectural term", https://martinfowler.com/articles/microservices.html, Microservices, Mar. 25, 2014, 15 pages.

Wiggins, "The Twelve-Factor App", https://12factor.net/, 2017, 3 pages.

List of IBM Patents or Patent Applications Treated as Related, dated Sep. 4, 2019, 1 page.

* cited by examiner

SOFTWARE CHANGE TRACKING AND MANAGEMENT

BACKGROUND

The present invention relates generally to continuous delivery (CD) systems for software development and, more particularly, to DevOps change tracking and management.

In general, DevOps is a software engineering practice that aims at unifying software development (Dev) and software operation (Ops), with the goal of shortening development cycles, increasing deployment frequency, and increasing dependability of releases. CD is a software engineering approach in which teams produce software in short cycles to ensure that the software can be reliably released at any time. In general, the CD process makes the delivery of new applications and services more agile than the traditional approach where software developers and operations personnel belonged to separate teams. Traditionally, tracking all software changes required between software applications (e.g., for maintenance, troubleshooting and regulatory compliance) has been performed by humans via manual updates to a change and configuration management database (CCMDB) when managing Change Requests (CR) for all affected components.

Microservices architecture structures a software application as a collection of loosely coupled services. In microservices architecture, services are generally fine-grained and the protocols are lightweight. One benefit of decomposing an application into different smaller services is that it improves modularity and makes the application easier to understand, develop and test. Additionally, microservices architecture enables autonomous development teams to develop, deploy and scale their respective services (microservices) independently. In microservices architecture, each microservice (i.e., subsystem) can be used by different applications. For example, in a banking application, a Personal Information Microservice to manage personal information can be used by a credit card payment system and by an online trading application. Accordingly, any changes to the Personal Information Microservice will impact both the credit card payment system and the online trading application.

SUMMARY

In an aspect of the invention, a computer-implemented method includes: receiving, by a computing device, build output code from one or more user computer devices via a network, wherein the build output code is generated in response to a software build; automatically identifying, by the computing device, differences between the build output code and associated in-production software code; automatically mapping, by the computing device, the differences to microservices of the in-production software code; and generating, by the computing device, a list of microservices of the in-production software code affected by the differences in a rollout of the build output code based on the mapping.

In another aspect of the invention, there is a computer program product for software change tracking and management. The computer program product comprises a computer readable storage medium having program instructions embodied therewith. The program instructions are executable by a computing device to cause the computing device to: receive build output code from one or more user computer devices via the network; access in-production software code; automatically identify differences between the build output code and the in-production software code; automatically map the differences to microservices of the in-production software code; generate a list of microservices of the in-production software code affected by the differences, based on the map; access a list of software components from a change configuration management database (CCMDB) via the network; generate a change list including one or more of the software components to be modified based on the list of microservices; and share the change list with the change configuration management database (CCMDB).

In another aspect of the invention, there is a system for software tracking and management. The system includes a CPU, a computer readable memory and a computer readable storage medium associated with a computing device; program instructions to automatically identify differences between build output code and in-production software code; program instructions to automatically map the differences to microservices of the in-production software code; program instructions to generate a list of microservices of the in-production software code affected by the differences, based on the map; program instructions to generate a change list including one or more software components to be modified based on the list of microservices; program instructions to determine required rollout steps for modifying the one or more software components of the change list based on historic software change data and rollout parameters associated with the build output code; program instructions to generate a forecast of expected down times required for the rollout of the build output code based on the historic software change data and the rollout parameters; and program instructions to send the forecast to a change configuration management database (CCMDB) via a network, wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
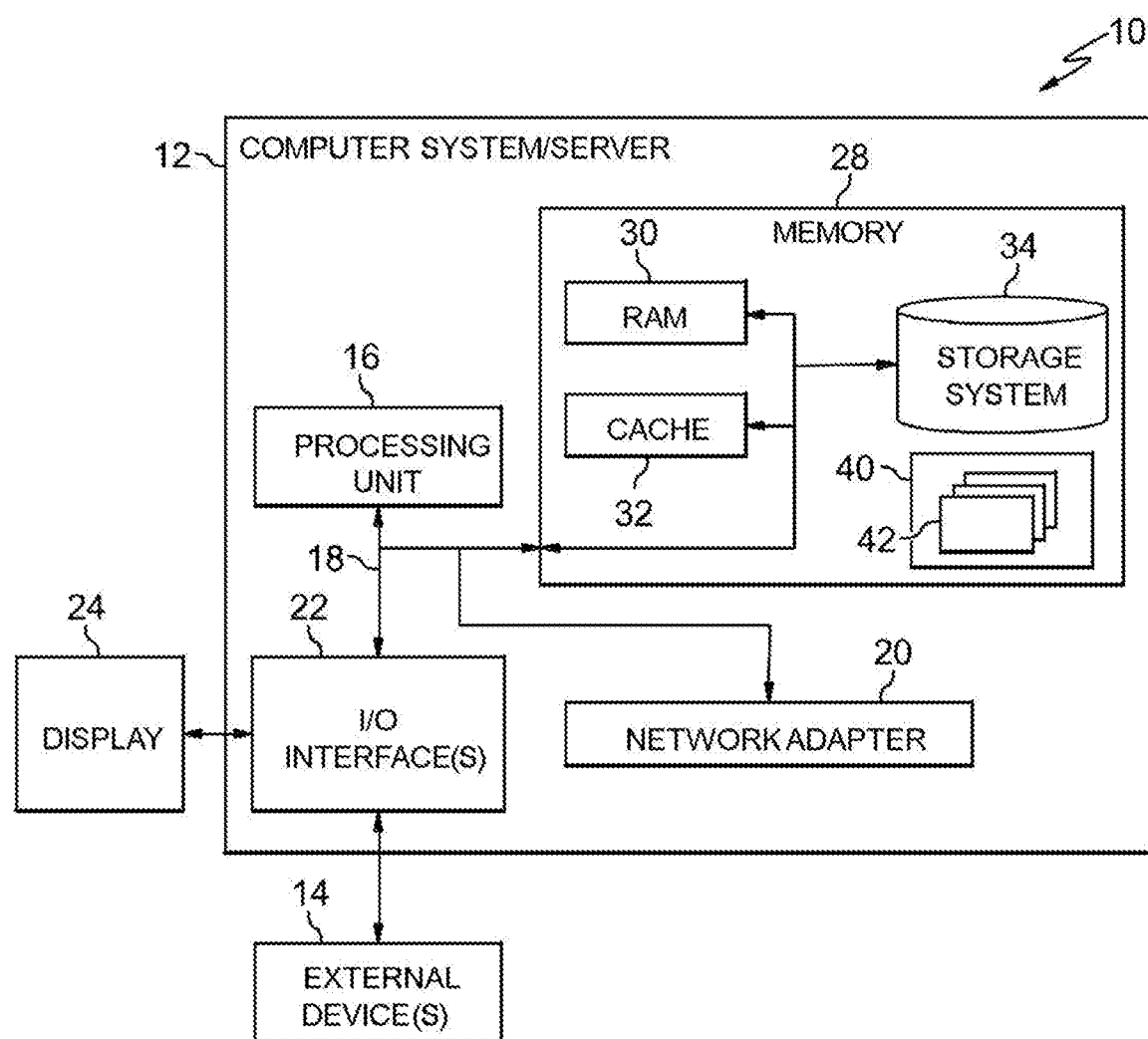
FIG. 1 depicts a computing infrastructure according to an embodiment of the present invention.

The present invention relates generally to continuous delivery (CD) systems for software development and, more particularly, to DevOps change tracking and management. In general, the CD process for software development makes the delivery of new applications and services more agile than the traditional approach where software developers and operations personnel belonged to separate teams. However, the problem exists of keeping track of all the software changes required between applications, which is important for maintenance and troubleshooting, and is often mandated by regulations. One traditional approach to tracking changes is to have humans manually updating a change and configuration management database (CCMDB) when managing Change Requests (CR) for all affected components. Such a method can be time consuming and prone to human error.

A technical problem exists in that a change in a subsystem of a first application may impact a second application, while there could be other applications not affected by that change. In a real life application, it's very complex to discover and keep track of all dependencies across different subsystems, particularly in a microservice architecture where the number of microservices can be in the hundreds. That is, in a microservice architecture, each microservice (subsystem) can be used by different applications. The term microservice as used herein refers to a relatively small piece of software code for functionality that is self-contained within the microservice. The extensive use of microservices makes it very complex to evaluate and calculate the risk related to the rollout of a new change. The term rollout as used herein refers to a staged series of activities or steps necessary to deploy software code.

Embodiments of the invention provide a technical solution to the problem of tracking and promulgating software changes throughout multiple applications and microservices by enabling a system to automatically identify the impact of a change on a code which runs in production mode. In aspects, a system is adapted to detect software components affected by a build (software build) by comparing artifacts being deployment in a Release Cycle with artifacts that are In-Production. The term build as used herein refers to a software development build in which software is constructed, or original software code is converted or modified, to produce a new software product (i.e., build output code). The term artifact as used herein refers to a tangible by-product produced during the development of software. For example, some artifacts (e.g., use cases, class diagrams, other Unified Modeling Language (UML) models, requirements and design documents) help describe the function, architecture and design of software. Starting from the differences in the artifacts (e.g., changes in database schema, changes in binaries, scripts, data, etc.) the system may detect affected subsystems (microservices) of the software build and track all the changes. In aspects, the system may determine what components (retrieved from the CCMDB) are impacted by the changes, based on a mapping of the artifacts to the components retrieved from a deployment model.

In aspects, when a list of affected components is created, the system determines whether or not an approval record is required (there may be some components that require approval records for changes, while others do not), according to predefined policies. In embodiments, the list of impacted components is also used to estimate which applications and systems will be affected during the rollout of the change, and the system also calculates a forecast of the duration of associated rollout outages (outage windows) to deploy the change. When all necessary approval records are collected by the system, the change is ready for rollout and all the components in the CCMDB are updated and their version increased (if necessary). This mechanism allows and an automated version update of the components (a version of a component is increased when a change in that component is detected). In aspects, component owners can configure the system to be notified when changes occur.

In embodiments, the system is configured to automatically calculate risks and impacts of rollout changes utilizing the following steps: 1) receiving code from developers at a source code management system; 2) triggering a build (software build) based on a schedule, on a manual request, or on event rules; 3) comparing the output of the build (executables, scripts, binary files, etc.) to the same files deployed in the production environment; 4) mapping all the differences detected at step 3 on each of the microservices (for instance: executable1 affects microservice1 and microservice2; the new database schema affects microservice3, etc. . . . ); 5) inferring, based on known microservices potentially affected by the change, what applications are affected based on the microservices used by each application; 6) providing, based on all known applications impacted, a list of expected downtimes (if any) required to rollout the change along with the exact list of applications that have risks to experience glitches due to the new version of software; 7) tracking the version in a CCMDB of each microservice to facilitate the revert of changes in case of unexpected behaviors; and 8) informing a user when software changes occur. In this manner, implementations of embodiments of the invention provide the advantages of enabling automatic detection of artifact changes during software release cycles compared to software in the production environment. Further, embodiments of the present invention provide the advantage of enabling tracking of microservices to facilitate the reversal of changes in the case of unexpected behaviors, as well as enabling forecasting of a duration of an outage window to deploy the change.

In embodiments, an estimation of an outage window is calculated taking in consideration different variables (how long it took in the past, the size of the files to be deployed, the amount of data to be converted, the estimated duration to install a software patch, etc.), and also a shared repository containing the historical data about the duration of similar activities made on other environments (not necessarily the same as the one affected by the change). The system may apply scaling factors in case the infrastructure is different (e.g., a slower network increases the outage window by 20%, or a high powered CPU reduces the outage window by 40%, etc.).

In embodiments, a system initiates changes in one or more data centers to achieve a profiled objective (e.g., minimizing the outage times for a rollout). In aspects, the system locally analyses required changes at the client level in order to logically decompose the changes according to real time data center conditions and node conditions. Examples of logical entities of the change include: 1) network tasks: file transfers (file dimensions, cryptography etc.); 2) human tasks: human activities classified in terms of complexity (e.g. number of steps, skill required etc.); and 3) automation tasks: workload to be accomplished by a machine (e.g. long running, CPU intensive, IO intensive etc.).

In embodiments, one or more data centers affected by the changes are analyzed by the system in order to map the changes to a specific data center topology. In aspects the system analyzes additional data centers that can share/transfer resources to the data center affected by the change, wherein the additional data centers are determined based on profiled logical groups and/or groups of affected data centers with specified affinity (e.g., regional location group, data centers behind the same firewall, etc.). In embodiments, according to a similar grouping or affinity approach, the system may also initiate the nodes inside the data center affected by the change to start a peer-to-peer node collaboration to achieve targeted change. In aspects, implementation of the data centers and nodes collaboration takes into account real time local condition for any logical entity of change to be achieved. Examples of those conditions are: 1) hardware real time characteristics of the machines: e.g. available central processing units (CPUs), available memory, etc.; 2) network data center: e.g., local & external real time network speed; and 3) the workload.

In embodiments, the system analyzes enterprise historical data of similar changes. For example, historic data regarding: 1) historical effort: e.g., required time for implementing similar changes, or time required for similar tasks; and 2) skills of the operators implementing changes/tasks.

In aspects, based on the analysis, the system reduces the outage by decomposing the changes in several logical entities and by optimizing them. For example, the system may: 1) assign the most skilled available person for each of the manual tasks; 2) leverage a logically created group of nodes (e.g., inside the affected data center or across data centers to move some of the entities of change out of targeted change scope); 3) reshape local conditions like network bandwidth or any other machine properties acting on third party activities belonging to the logically created groups; 4) leverage historical data to continuously forecast service level agreements (SLAs) matching, and 5) repeat/iterate any of the above steps to realize optimizations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
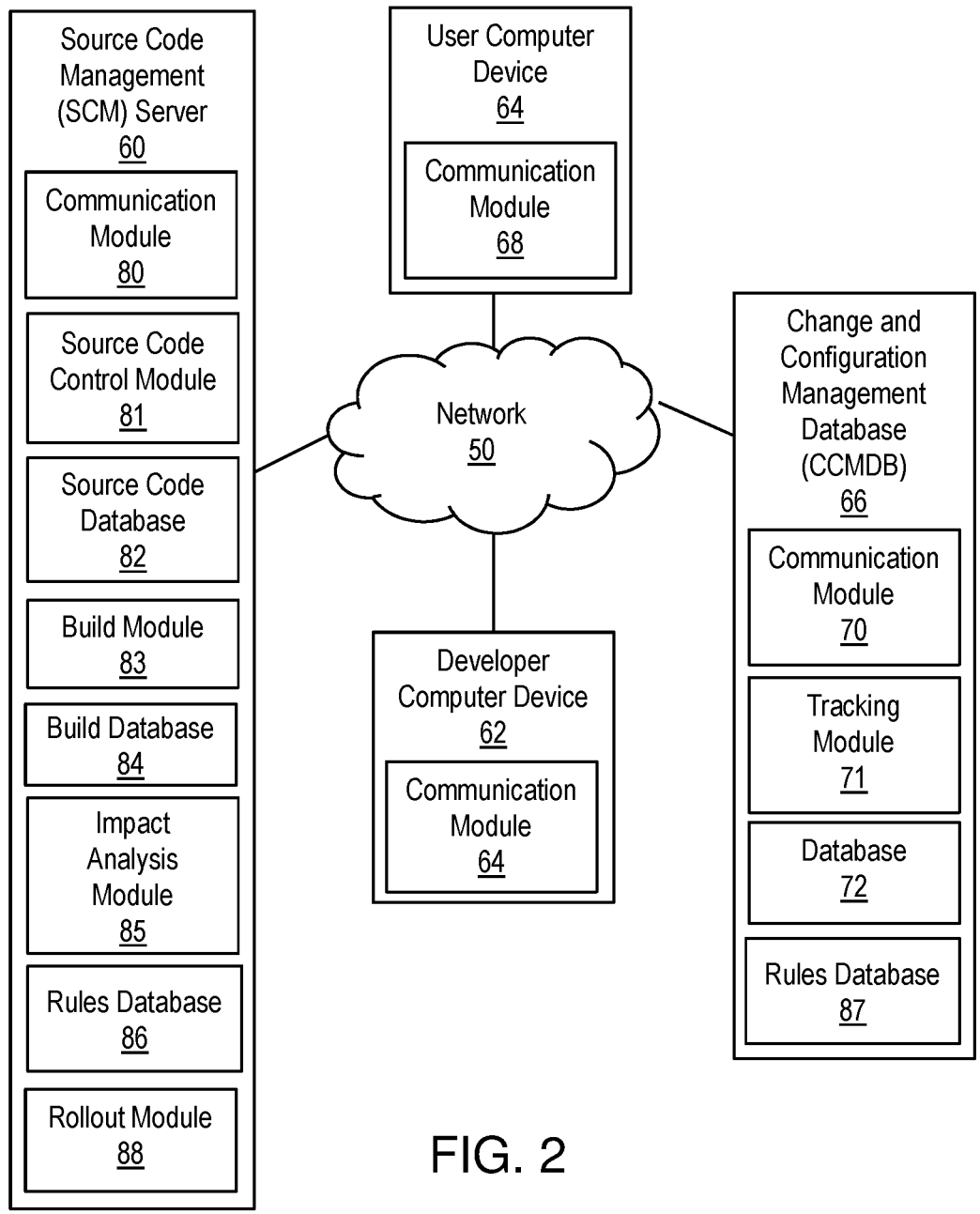
FIG. 2 shows an exemplary environment in accordance with aspects of the invention.

FIG. 2 shows an exemplary environment in accordance with aspects of the invention. The environment includes a network 50 connecting a source code management (SCM) server 60 with one or more developer computer devices indicated at 62, one or more user computer devices indicated at 64 and a Change Configuration Management Database (CCMDB) 66. The SCM server 60 may comprise a computer system 12 of FIG. 1, and may be connected to the network 50 via the network adapter 20 of FIG. 1. The SCM server 60 may be configured as a special purpose computing device that is part of a software development infrastructure.

The network 50 may be any suitable communication network or combination of networks, such as a local area network (LAN), a general wide area network (WAN), and/or a public network (e.g., the Internet). The developer computer device 62 and the user computer device 64 may comprise components of the computing device 12, may be connected to the network 50 via a network adapter (e.g., network adaptor 20 of FIG. 1), and may be a desktop computer, laptop computer, tablet computer, etc.

The CCMDB 66 may also comprise components of the computing device 12, and may be connected to the network 50 via a network adapter (e.g., network adaptor 20 of FIG. 1). The CCMDB 66 may be configured as a special purpose computing device that is part of the software development infrastructure. The CCMDB 66 may be an existing database utilizing a number of different configuration management tools and methods. The CCMDB 66 may include a plurality of program modules (e.g., program module 42 of FIG. 1) executed by the CCMDB 66 and configured to perform one or more of the functions described herein. In embodiments, the CCMDB 66 includes a communication module 70 for communicating with one or more additional computing devices (e.g., SCM server 60, developer computer device 62, user computer device 64) via the network 50. In aspects, the CCMDB 66 includes a tracking module 71 configured to log incidents and change orders in a database 72, track configuration items (CIs) and the relationships between them, and store historic management data (e.g., historic software change tracking data) in the database 72. The term CIs as used herein refers to IT infrastructure (e.g., software applications, a server, etc.) under the control of a configuration management process.

Still referring to FIG. 2, the SCM server 60 may include a plurality of program modules (e.g., program module 42 of FIG. 1) executed by the SCM server 60 and configured to perform one or more of the functions described herein. In embodiments, the SCM server 60 includes a communication module 80 for communicating with the developer computer device 62, the user computer device 64 and the CCMDB 66. In embodiments, the communication module 80 is configured to communicate with the CCMDB 66 to determine when a build has been triggered. The term build as used herein refers to a software development build in which software is constructed, or original software code is converted or modified, to produce a new software product (i.e., build output code).

With reference to FIG. 2, the SCM server 60 may include a source code control module 81 configured to receive in-production software code, including one or more microservices, from one or more outside sources (e.g., the developer computer device 62, the user computer device 64 and the CCMDB 66), and store the in-production software code in a source code database 82. The term in-production software code refers to software code that is currently deployed in one or more products, or is software code that is in its original form (original software code) prior to being modified in a build of the present invention.

The SCM server 60 may include a build module 83 configured to receive build output code from one or more developer computer devices 62 and save the build output code in a build database 84. The term build output code refers to software code developed in accordance with a build. In embodiments, the SCM server 60 includes an impact analysis module 85 configured to compare the build output code to the in-production software code (e.g., compare artifacts of the build output code with artifacts of the in-production software code) to identify one or more modified microservice of the build output code. In aspects, the impact analysis module 85 is configured to map all differences detected to associated microservices (affected microservices). In embodiments, the impact analysis module 85 is configured to infer one or more existing software applications are affected by the build output code based on microservices utilized by each of the existing software applications. In aspects, the impact analysis module 85 determines, based on predefined policies stored in a rules database 86 of the SCM server or a rules database 87 of the CCMDB, whether an approval record is required to implement changes associated with rollout of the build output code, and automatically initiate changes when no approval record is required. A rollout of new software (e.g., the build output code) may require new infrastructure, changes to infrastructure (e.g., local changes to data center topology nodes), and changes to a variety of software applications.

Still referencing to FIG. 2, in embodiments, the SCM server 60 includes a rollout module 88 configured to determine a list of expected downtimes (forecasted outage windows) required to rollout the build output code, along with a list of software applications that are at risk of experiencing errors or glitches due to the build output code, based on historic configuration management data. The rollout module 88 may determine data centers associated with software components on a change list; determine rollout steps for implementing the rollout; identify additional data centers that may assist with the rollout; make changes to available resources of the data centers or additional data centers to reduce outage windows; and automate initiation of rollout steps.

In embodiments, the environment of the present invention may include additional or fewer components than those shown in FIG. 2. In aspects, separate components may be integrated into a single computing component or module. Additionally, or alternatively, a single component may be implemented as multiple computing components or modules.

The quantity of devices and/or networks in the environment of FIG. 2 is not limited to what is shown in FIG. 2. In practice, the environment may include additional devices and/or networks; fewer devices and/or networks; different devices and/or networks; or differently arranged devices and/or networks than illustrated in FIG. 2. Also, in some implementations, one or more of the devices of the environment may perform one or more functions described as being performed by another one or more of the devices of the environment. Devices of the environment may interconnect via wired connections, wireless connections, or a combination of wired and wireless connections.

Figure 3:
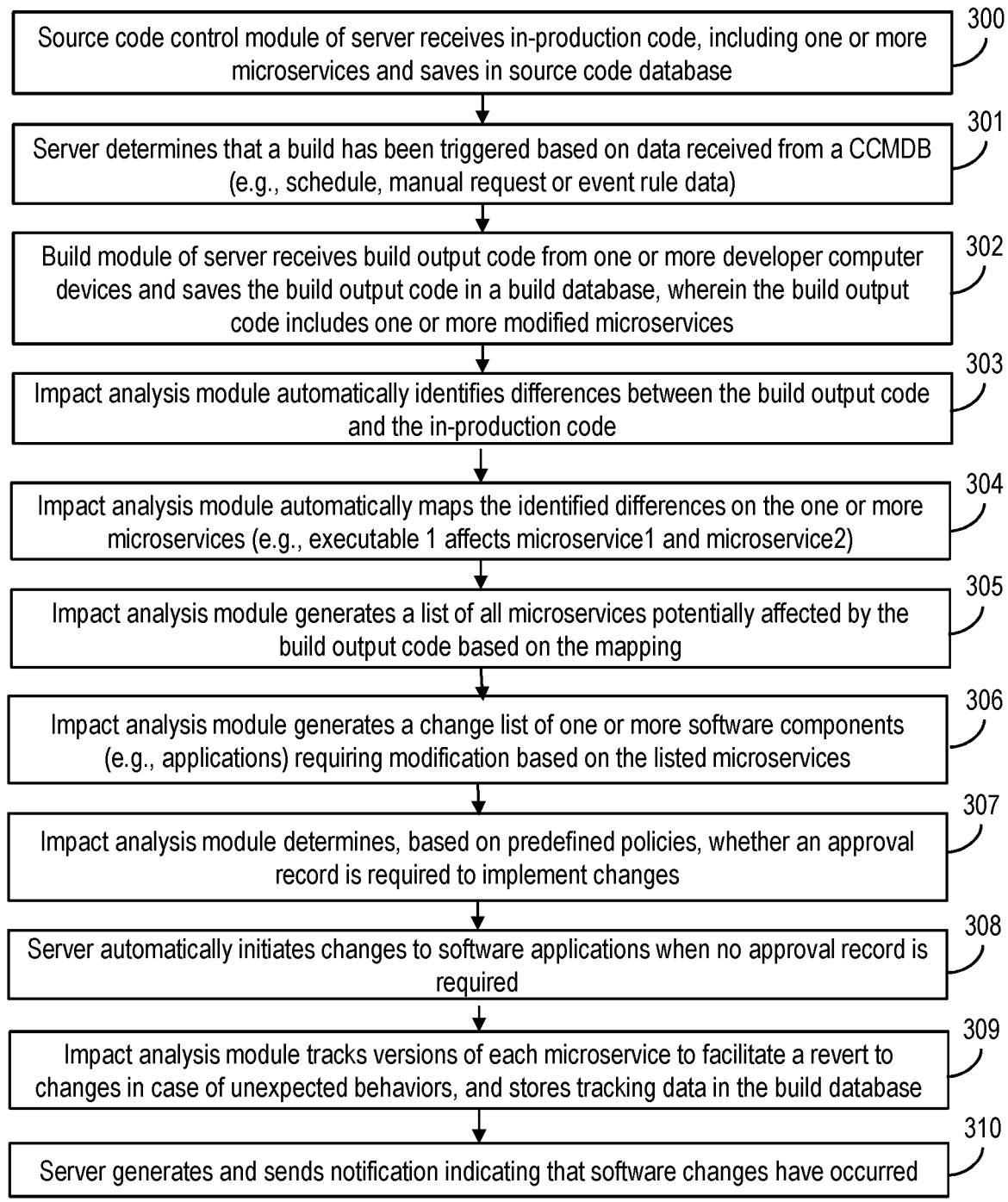
FIG. 3 shows a flowchart of steps of a method in accordance with aspects of the invention.

FIG. 3 shows a flowchart of a method in accordance with aspects of the invention. Steps of the method of FIG. 2 may be performed in the environment illustrated in FIG. 2, and are described with reference to elements shown in FIG. 2.

At step 300, the source code control module 81 of the SCM server 60 receives in-production code, the code including one or more microservice, and saves the in-production code in the source code database 82. The source code control module 81 may receive the in-production code from the CCMDB 66, the developer computer device 64 or the user computer device 64, via the network 50.

At step 301, the SCM server 60 determines that a build has been triggered based on data received from the CCMDB 66. The data from the CCMDB 66 may be in the form of a notification that a build has been triggered based on a schedule, a manual request for a build, event rule data, or other triggering event.

At step 302, the build module 83 receives build output code and saves the build output code in the build database 84. In aspects, the build module 83 receives the build output code from one or more developer computer devices 62.

At step 303, the impact analysis module 85 automatically identifies differences between the build output code and the in-production code. In aspects, the impact analysis module 85 compares artifacts of the build output code to artifacts of the in-production code to identify the differences (e.g., changes in database schema, binaries, scripts, data, etc.).

At step 304, the impact analysis module 85 automatically maps the differences identified at step 303 to one or more microservices. For example, the impact analysis module 85 may access a database of microservices (e.g., database 72 of CCMDB 66) and determine that an identified difference in an executable1 affects both a microservice1 and a microservice2, and that an identified difference in a database schema affects a micorservice3.

At step 305, the impact analysis module 85 generates a list microservices affected by, or potentially affected by, the build output code based on the mapping of step 304, and saves the list in the build database 84. For example, based on the mapping of step 304, the list may indicate that microservices1-3 are affected by the build output code.

At step 306, the impact analysis module 85 generates a change list of one or more software applications requiring modification based on the list of microservices generated at step 305. In aspects, the impact analysis module 85 accesses a database (e.g., database 72 of CCMDB 66) of software applications including associated microservices, and determines the change list based on software applications including microservices that match microservices in the list of microservices affected by the build output code. For example, a microservice4 configured to manage personal information may be utilized by both a credit card payment application and an online trading application. Thus, a change in the microservice4 will impact both the credit card payment application and the online trading application. In this example, the change list would include changes required for both the credit card payment application and the online trading application. In embodiments, the impact analysis module 85 shares the change list with the CCMDB 66 via the network 50.

At step 307, the impact analysis module 85 determines, based on predefined policies, whether an approval record is required to implement changes required for the rollout of the build output code (e.g., changes required to software applications on the change list). The term approval record as used herein refers to an indication that a change is approved. It should be understood that administrators of a continuous delivery process may define rules to specify who approves change requests. Typically, non-standard change requests require approval before they can be completed. In aspects, a given change (e.g., a change in the change list of step 306) requiring an approval record may be flagged as pending (awaiting approval) or approved, for example. Approval records may be obtained locally at the SCM server 60 or may be obtained through the CCMDB 66.

At step 308, the SCM server 60 automatically initiates changes to one or more software applications on the change list when the impact analysis module 85 determines at step 307 that no approval record is required to implement the changes, or that an approval record as been received. In aspects, this may comprise the SCM server 60 determining, based on predefined policies in the rules database 86 of the SCM server 60 or the rules database 87 of the CCMDB 66 that a change on the change list does not require an approval record. In embodiments, the SCM server 60 automatically initiates changes to one or more software applications by automatically updating affected microservices (microservices in the list of microservices affected by the build output code) of the software applications. In embodiments, the SCM server 60 automatically initiates changes to one or more software applications by providing instructions to change the one or more software applications to a remote computing device (e.g., CCMDB 66).

At step 309, the SCM server 60 tracks versions of each microservice changed in the course of a rollout of the build output code and stores associated tracking data in the build database 84. In this way, the SCM server 60 enables a revert to changes (e.g., rollback) in the case of unexpected behaviors. In aspects, the SCM server 60 shares the tracking data with the CCMDB 66. In embodiments, step 309 is implemented by at least one of the impact analysis module 85 and the rollout module 88 of the SCM server 60.

Optionally, at step 310, the SCM server 60 generates and sends a notification indicating that one or more software changes have occurred. In embodiments, the SCM server 60 accesses rules in a rules database (rules database 86 or 87), including rules defining when a notification should be generated and sent in accordance with step 310. In aspects, a component owner (e.g., software application owner) may selectively configure user options provided by the SCM server 60 to elect to be notified when changes to their component are initiated by the SCM server 60.

Figure 4:
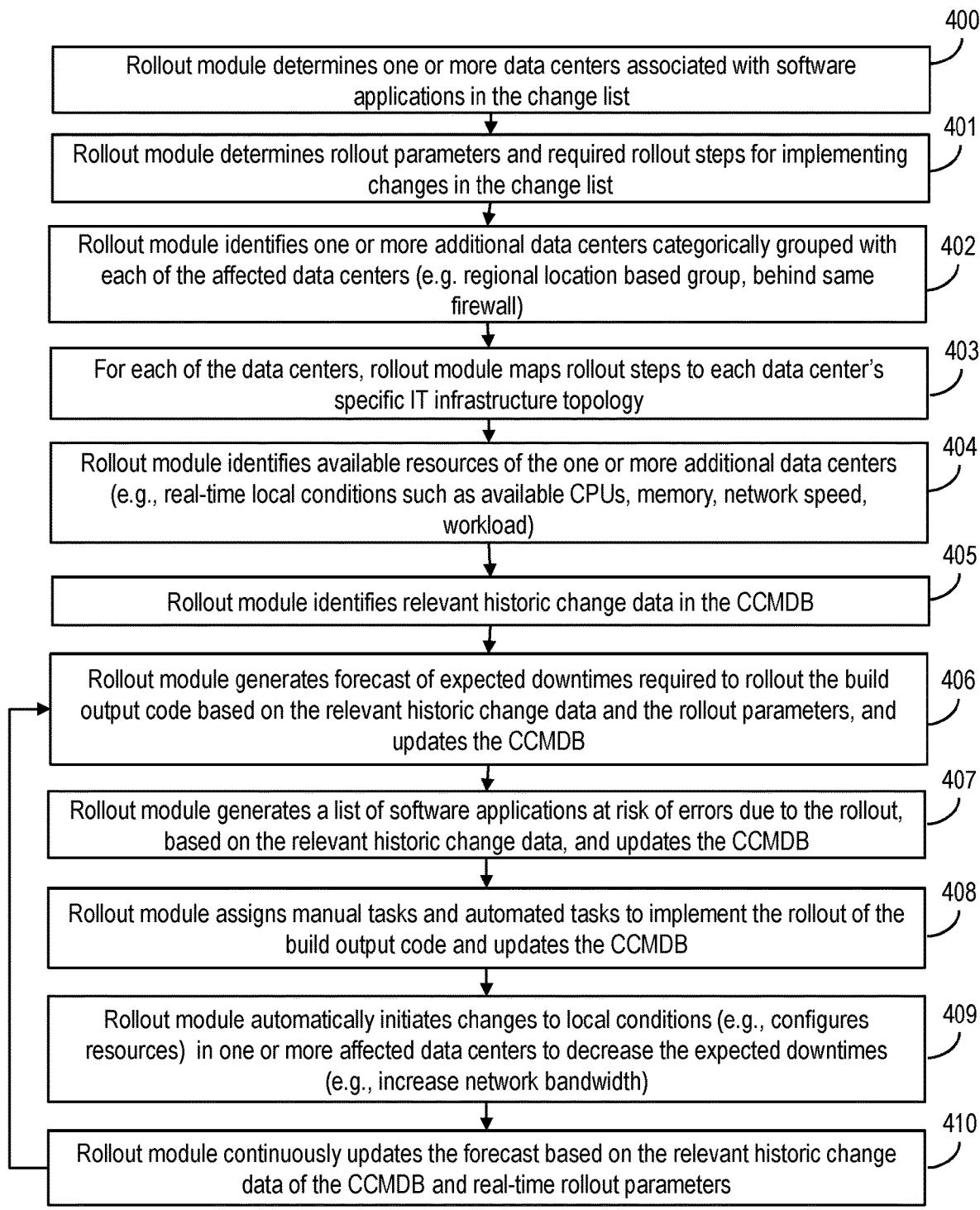
FIG. 4 shows a flowchart of steps of a method in accordance with aspects of the invention.

FIG. 4 shows a flowchart of a method in accordance with aspects of the invention. Steps of the method of FIG. 2 may be performed in the environment illustrated in FIG. 2, and are described with reference to elements shown in FIG. 2. Additionally, information gathered in accordance with the steps of FIG. 3 may be utilized in the performance of forecasting and change managements steps of FIG. 4.

At step 400 of FIG. 4, the rollout module 88 determines one or more data centers (affected data centers) associated with the software applications in the change list. The term data center as used herein refers to a facility used to house computer systems and associated components (i.e., resources of the data center).

At step 401, the rollout module 88 determines rollout parameters and rollout steps for implementing changes in the change list. The term rollout parameters as used herein refers to parameters affecting the implementation of the rollout, such as the size of software files to be deployed, the amount of data to be converted, estimated duration to install a software patch, etc. Moreover, rollout parameters may include parameters of the affected data centers determined at step 400 (e.g., resources available). In embodiments, the rollout module 88 analyzes a change in the change list generated at step 306 of FIG. 3 locally at the client level in order to logically decompose the change according to real time data center and node condition to determine individual rollout steps. For example, local entities of the change may include: 1) network tasks or subtasks (e.g., file transfers requiring subtasks of file dimensioning and cryptography, etc.); 2) human tasks (e.g., human activities classified in terms of complexity, such as number of steps, skills required, etc.); and 3) automation tasks (e.g., workload to be accomplished by a machine, such as tasks which are long running, CPU intensive, input/output-intensive, etc.).

At step 402, the rollout module 88 identifies one or more additional data centers categorically grouped with each of the affected data centers. Categorical groupings may include groupings by regional location, grouping by firewall, etc. In embodiments, the rollout module 88 may access a database of data centers (e.g. located on the SCM server 60 or the CCMDB 66) in order to determine an additional data center(s) which matches (i.e., is in the same category as) as the affected data center(s).

At step 403, the rollout module 88 maps rollout steps to each affected data center's IT infrastructure topology. In embodiments, the rollout module 88 may utilize historic rollout data from similar data centers (i.e., the additional data centers identified at step 402) in order to determine which rollout steps map to which infrastructure topology of a data center.

At step 404, the rollout module 88 identifies available resources of the one or more additional data centers identified at step 402. For example, resources may include real-time local conditions such as available CPUs, memory, network speed, workload/availability, etc. In aspects, the rollout module 88 may utilize data available through the CCMDB 66 to determine the available resources. In aspects, the rollout module 88 selects one or more of the available resources of the additional data centers to assist with the rollout of the build output code. In embodiments, the SCM server 60 automatically initiates modifications to the one or more software components, based on the change list, utilizing the one or more of the available resources. Such modifications may be initiated in accordance with step 308 of FIG. 3.

At step 405, the rollout module 88 identifies relevant historic change data in the CCMDB 66. In embodiments, the rollout module 88 identifies one or more historic rollout steps in the historic change data that is/are similar to the rollout steps determined at step 401 in the same or a different environment. Historic change data may include parameters regarding the size of files deployed, the amount of data changed, implementation time (outage windows), nature of the change(s), etc. In aspects, the rollout module 88 compares rollout parameters determined at step 401 with historic change data parameters in order to identify relevant historic change data (e.g., parameters match or are similar within a certain confidence level).

At step 406, the rollout module 88 generates a forecast of expected downtimes (outage windows) required to rollout the build output code based on the relevant historic change data identified at step 405 and the rollout parameters determined at step 401. In aspects, the rollout module 88 communicates the forecast to the CCMDB 66 via the network 50 to update the CCMDB 66. In embodiments, the rollout module 88 applies scaling factors to the relevant historic change data to account for differences between historic parameters and rollout parameters. For example, a scaling factor may be applied to account for the fact that a slower network increases an outage window by 20%, or that a high power CPU reduces an outage window by 40%.

At step 407, the rollout module 88 generates a list of software applications at risk of errors due to the rollout, based on the relevant historic change data. For example, the rollout module 88 may access the relevant historic change data in the CCMDB 66 and compare historic changes to changes on the list of changes for the rollout (determined at step 306 of FIG. 3) to identify historic problems with prior rollouts that may be relevant to the present rollout. In aspects, the rollout module 88 communicates the list of applications at risk to the CCMDB 66.

At step 408, the rollout module 88 automatically assigns manual tasks and automated tasks of the rollout steps determined at step 401. In embodiments, the rollout module 88 can utilize a database of resources (human and computer-based) stored in the SCM server 60 or the CCMDB 66 to determine which human or computer-based resource to assign to each of the manual and automated tasks in accordance with step 408. In aspects, the rollout module 88 shares the assignment of tasks from step 408 with the CCMDB 66.

In embodiments, at step 409, the rollout module 88 automatically initiates changes to local conditions (e.g., reconfigures resources) in one or more of the affected data centers to decrease the expected downtimes of the forecast generated at step 406. For example, the rollout module 88 may send instructions to a data center to cause the network bandwidth at the data center to be increased in order to reduce processing times required to implement changes at the data center. Step 409 may be implemented in conjunction with step 308 of FIG. 3. In embodiments, the rollout module 88 initiates changes to multiple data centers by sending instructions to one or more data centers to share or transfer resources. In aspects, data centers of a same or similar categorical group may receive instructions from the rollout module 88 to start a peer-to-peer node collaboration to achieve targeted changes to local conditions within the data centers. For example, the rollout module 88 may cause resources within data centers to share storage space (memory), computational resources (processors) or the like.

At step 410, the rollout module 88 continuously updates the forecast generated at step 406 based on relevant historic change data of the CCMDB 66 (which may be continuously updated at the CCMDB 66), and real-time rollout parameters. In this way, automatic changes to local conditions implemented at step 409 will be accounted for in any subsequent re-forecasting, such that forecasting data can be updated in real-time based on real world conditions.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for software change tracking and management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
automatically identifying, by a computing device, differences between a build output code and an in-production software code by comparing artifacts of the in-production software code with artifacts of the build output code;
automatically mapping, by the computing device, the differences between the build output code and the in-production software code to respective microservices of the in-production software code, wherein each of the microservices is a piece of software code for performing a respective function;
generating, by the computing device, a list of microservices of the in-production software code based on the mapping;
generating, by the computing device, a change list including one or more software applications to be modified in a rollout of the build output code based on the list of microservices;
automatically assigning, by the computing device, manual tasks of required rollout steps to one or more agents and automated tasks to one or more available resources of one or more affected data centers;
updating, by the computing device, a change configuration management database (CCMDB) with the assignments of the manual tasks and automated tasks, via the network; and
automatically initiating, by the computing device, changes to the one or more software applications based on the differences between the build output code and the in-production software code.

2. The computer-implemented method of claim 1, wherein the microservices of the in-production software code are microservices determined to be affected by each of the differences.

3. The computer-implemented method of claim 1, further comprising:
determining, by the computing device, that an approval record is not required by the computing device to implement the changes to the one or more software applications based on one or more predefined policies, wherein the automatically initiating the changes to the one or more software applications occurs in response to the determining that the approval record is not required.

4. The computer-implemented method of claim 1, further comprising sending, by the computing device, a notification indicating that the changes were made to the one or more software applications.

5. The computer-implemented method of claim 1, further comprising determining, by the computing device, the one or more affected data centers associated with the one or more software applications of the change list.

6. The computer-implemented method of claim 5, further comprising:
accessing, by the computing device, historic software change data in the change configuration management database (CCMDB) via a network;
determining, by the computing device, rollout parameters for the build output code;
determining, by the computing device, the required rollout steps for modifying the one or more software applications of the change list based on the historic software change data and the rollout parameters; and
mapping, by the computing device, the required rollout steps to information technology (IT) topology of the one or more affected data centers.

7. The computer-implemented method of claim 6, further comprising:
identifying, by the computing device, one or more additional data centers categorically grouped with each of the one or more affected data centers;
identifying, by the computing device, available resources of the additional data centers; and
identifying, by the computing device, one or more of the available resources to assist with the rollout steps for modifying the one or more software applications,
wherein the automatically initiating the changes to the one or more software applications utilizes the one or more of the available resources.

8. The computer-implemented method of claim 1, further comprising:
identifying, by the computing device, the historic software change data in the change configuration management database (CCMDB) relevant to the rollout of the build output code;
generating, by the computing device, a forecast of expected down times required for the rollout of the build output code based on the identified historic software change data and the rollout parameters; and
updating, by the computing device, the change configuration management database (CCMDB) with the forecast, via the network.

9. The computer-implemented method of claim 8, further comprising automatically initiating reconfiguration of the one or more available resources of the respective one or more affected data centers to decrease the expected down times.

10. A computer program product comprising a computer readable storage medium having program instructions embodied therewith, the program instructions executable by a computing device to cause the computing device to:
automatically map differences between a build output code and an in-production software code to respective microservices of the in-production software code, wherein each of the microservices is a piece of software code for performing a respective function;
generate a list of microservices of the in-production software code affected by the differences, based on the map;
generate a change list including one or more software applications to be modified based on the list of microservices;
determine required rollout steps for modifying the one or more software applications of the change list based on historic software change data and rollout parameters for the build output code;
automatically assign manual tasks of the required rollout steps to one or more agents and automated tasks to one or more available resources of one or more affected data centers;
update a change configuration management database (CCMDB) with the assignments of the manual tasks and automated tasks, via a network; and
automatically initiate changes to the one or more software applications.

11. The computer program product of claim 10, wherein the program instructions further cause the computing device to:

determine that an approval record is not required to implement the changes to the one or more software applications based on one or more predefined policies, wherein the automatically initiating the changes to the one or more software applications is performed in response to the determining that the approval record is not required.

12. The computer program product of claim 10, wherein the program instructions further cause the computing device to send a notification indicating that the changes were made to the one or more software applications to a remote computing device via the network.

13. The computer program product of claim 10, wherein the program instructions further cause the computing device to:
determine the one or more affected data centers associated with the one or more software applications of the change list;
access the historic software change data in the change configuration management database (CCMDB) via the network;
determine the rollout parameters for the build output code;
map the required rollout steps to information technology (IT) topology of the one or more affected data centers.

14. The computer program product of claim 13, wherein the program instructions further cause the computing device to:
identify one or more additional data centers categorically grouped with each of the one or more affected data centers;
identify available resources of the additional data centers; and
identify one or more of the available resources to assist with the rollout steps for modifying the one or more software applications;
wherein the automatically initiating the changes to the one or more software applications utilizes the one or more of the available resources.

15. The computer program product of claim 13, wherein the microservices are microservices determined to be affected by each of the differences, and wherein the program instructions further cause the computing device to:
generate a forecast of expected down times required for the rollout of the build output code based on the historic software change data and the rollout parameters; and
update the change configuration management database (CCMDB) with the forecast, via the network.

16. The computer program product of claim 13, wherein the program instructions further cause the computing device to automatically initiate reconfiguration of the one or more available resources of the respective one or more affected data centers to decrease the expected down times.

17. A system for software tracking and management comprising:
a CPU, a computer readable memory and a computer readable storage medium associated with a computing device;
program instructions to automatically map differences between a build output code and an in-production software code to respective microservices of the in-production software code, wherein each of the respective microservices is a piece of software code for performing a function;
program instructions to generate a list of microservices of the in-production software code affected by the differences, based on the map;
program instructions to generate a change list including one or more software applications requiring modification, in a rollout of the build output code, based on the list of microservices,
program instructions to automatically assign manual tasks of required rollout steps to one or more agents and automated tasks of the rollout to one or more available resources of one or more affected data centers;
program instructions to update a change configuration management database (CCMDB) with the assignment of the manual tasks and the automated tasks, via a network; and
program instructions to automatically reconfigure a computer resource at one or more of the affected data centers based on the required rollout steps;
wherein the program instructions are stored on the computer readable storage medium for execution by the CPU via the computer readable memory.

18. The system of claim 17, wherein the microservices are microservices determined to be affected by the differences, the system further comprising:
program instructions to determine required rollout steps for modifying the one or more software applications of the change list based on historic software change data and the rollout parameters associated with the build output code, wherein the rollout parameters are selected from the group consisting of: a size of the build output code, an amount of data to be modified, estimated change implementation times, and available resources; and
program instructions to generate a forecast of expected down times required for the rollout of the build output code based on the historic software change data and the rollout parameters.

* * * * *